US006347396B1

(12) United States Patent
Gard et al.

(10) Patent No.: US 6,347,396 B1
(45) Date of Patent: Feb. 12, 2002

(54) DISTURBANCE FREE UPDATE OF DATA

(75) Inventors: Bengt Erik Ingemar Gard, Tullinge; Lars-Örjan Kling, Södertälje; Sten Edvard Johnsson, Farsta, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/265,950

(22) Filed: Mar. 11, 1999

(30) Foreign Application Priority Data

Mar. 12, 1998 (DE) ......................................... 198 10 802

(51) Int. Cl.[7] ............................................. G06F 9/455
(52) U.S. Cl. .......................... 717/11; 707/10; 707/104.1
(58) Field of Search ............................. 717/11; 707/10, 707/104.1

(56) References Cited

U.S. PATENT DOCUMENTS

| 5,142,680 A | * | 8/1992 | Ottman et al. ................. 717/11 |
| 5,155,837 A | | 10/1992 | Liu et al. |
| 5,586,304 A | * | 12/1996 | Stupek, Jr. et al. ........... 717/11 |
| 5,604,906 A | * | 2/1997 | Murphy et al. ................ 717/11 |
| 5,826,265 A | * | 10/1998 | Huben et al. ................... 707/8 |
| 5,930,513 A | * | 7/1999 | Taylor .......................... 717/11 |
| 5,960,189 A | * | 9/1999 | Stupek, Jr. et al. ........... 717/11 |
| 6,018,747 A | * | 1/2000 | Burns et al. ................. 707/203 |
| 6,055,363 A | * | 4/2000 | Beals et al. .................... 717/11 |

FOREIGN PATENT DOCUMENTS

| EP | 0 803 806 A2 | 11/1997 |
| WO | 94/01819 | 1/1994 |

OTHER PUBLICATIONS

English translation of Claim 1 of D1 (DE 41 34 207 C1).
English translation of Claim 1 of D2 (DE 43 16 500 C2).
Ulf Keutel, Ulla Lundstrom, and Sven Selterqvist, "Remote Upgrading and Updating og AXE 10 Software", dated 1996, pp. 1–10.
Deepak Gupta and Pankaj Jalote, "On–line Software Version Change Using State Transfer Between Processes", Software—Practice and Experience, vol. 23(9), Sep. 1993, pp. 949–964.
International Search Report dated Sep. 3, 1999.
Applicant provided concise English language explanations of German Patent DE 41 34 207 C1.
Applicant provided concise English language explanation of German Patent DE 43 16 500 C2.

\* cited by examiner

*Primary Examiner*—Mark R. Powell
*Assistant Examiner*—Todd Ingberg
(74) *Attorney, Agent, or Firm*—Burns, Doane, Swecker & Mathis, L.L.P.

(57) ABSTRACT

To improve the efficiency for an update process in a software processing device with a plurality of memory partitions (4,14) it is proposed to continue the execution of old software on original data stored in a first memory partition (4). In case the same state for data of old and new software is achieved (S4) an instant switch of services to the new software as far as the same state is achieved (S5) takes place. This processing is repeated (S6) until no data to be transferred remains (S6) in the first memory partition. Thus, the present invention allows for a considerable improvement of the update efficiency with reduced disturbances during data transfer.

34 Claims, 10 Drawing Sheets

DISTURBANCE FREE UPDATE OF DATA

This application claims priority under 35 U.S.C. §§119 and/or 365 to 198 10 802.8 filed in Federal Republic of Germany on Mar. 12, 1998; the entire content of which is hereby incorporated by reference.

FIELD OF INVENTION

The present invention relates to the field of disturbance free update of data, in particular to the field of disturbance free update of software and related data in a software processing device and also a method adapted thereto.

BACKGROUND OF INVENTION

The evolution of data processing equipment and software technology leads to an increasing demand for methodologies to update software.

The usual methodology to achieve this goal is to stop the execution of the installed software, load the new software and then start the new software. Using this approach, no internal data is transferred between the old and the new software. Also, with this method all the established services are lost and all service is completely stopped during the load and start of the new software. Currently, this method is typically used for, e.g., work stations or personal computers.

Another method is to load the new software while the old software continues to operate on the old data. However, during the transfer of data between the old software and the new software, usually the execution of the old software is fully stopped. One such example is described in "Remote upgrading and updating of AXE10 software", pages 66–67, Ericsson Rev. No. 2, 1996, and relates to the transfer of variables in a record which are handled together in an iteration over all variables of the record.

In particular, usually variables to be transferred are identified through the designers of new software. Also, for each variable that must be converted, a respective conversion program must be prepared. This conversion program then executes the necessary transformations and transfers the result to the newly installed software.

However, the disadvantage with the above described solution is that the overall characteristics and performance of the system is deteriorated. In particular, during the data transfer, the execution of software is stopped in order to get a consistent copy of data of the old software.

Therefore, in U.S. Pat. No. 5,155,837 it is proposed to switch the input of data for new services to the new software in a first step. Further, when the service in progress in the old software is completed, the output of data from the services is switched from the old version to the new version. However, this solution may only handle software that handles services with a very short duration since the software according to the old version must first be finished before the new software version is fully operative.

SUMMARY OF THE INVENTION

In view of the above, the object of the invention is to achieve a disturbance free update for software with improved efficiency.

According to the invention, this object is achieved with a software processing device of the type with update functionality comprising memory means subdivided into a first memory partition storing a first group of software modules and related data, and a second memory partition storing a second group of software modules and related data, software update means adapted to load software and related data into the first memory partition while simultaneously continuing software processing with software stored in the second memory partition. The execution of software is instantly switched over to the new memory partition as soon as the same state for the newly loaded and the executing software is achieved.

Overall, to achieve a highly efficient and disturbance-free update of software modules even if there prevails old software that handles services with long duration, according to the invention it is proposed to update the new software with all necessary data of the old software while the old software is continuously executed. Immediately when data of the new software has reached the same state as data of the old software, the new software is taking over execution of the related functionality.

Further, according to a preferred embodiment of the invention, the software update means comprises update control means adapted to evaluate whether software in the newly loaded memory partition and the executing memory partition have reached a state to switch over execution of software. Preferably, the software update means further comprises interface and conversion means to load software and related data through the data transfer between different memory partitions in the software processing device. Also, preferably, the interface and conversion means carries out the transfer of software in a single background process and carries out the transfer of related data in a plurality of background processes. The single background process and the plurality of background processes are executed simultaneously with the execution of currently installed software.

Thus, to take care of the transfer of all necessary data related to different software at least one background process is run that handles all data pointed out to be transferred. Here, the background process either transfers the data to the new software unchanged or starts a conversion program, if necessary.

Since according to the invention the execution of software continues while the background process is running, data already being transferred may be changed through the old software. To achieve consistent data between the old and new software each such change of a variable is again transferred to the new software. In other words, at each write of already copied data through the old software the data is again transferred to the new software. In the case of data to be converted further a conversion program is started for this data and the conversion output is again transferred to the new software.

Therefore, according to the present invention it is possible to get all necessary data for the old software transferred to the new software without loosing any service already established through the execution of old software and without stopping the establishment of services during the transfer of data or during any other time. In particular, the transfer of data may involve the conversion of data to the representation and data structures of the new software.

Therefore, according to the present invention it is possible to heavily reduce the disturbance in case a functionality change is executed. Thus, a function change may be executed during normal working hours instead of during the night. Service providers of the software do not loose any revenue by doing an upgrade and subscribers to services provided by the software will not experience any deteriorated service.

Further, according to the present invention software updates may be added more frequently to the system since the costs for doing so are significantly reduced. Also, new features may be offered earlier to subscribers.

The same advantages are achieved with the inventive method for updating software comprising the steps loading new software and transferring all data used by the old software and the new software while execution of the old software is continued, evaluating whether the data of the new software has reached the same state as the data of the old software, and instantly switching the service to the new software as far as the state of data for the new software and the old software is equal.

According to a preferred embodiment of the inventive method, the data to be transferred is identified in at least one background process while the old software is continuously executed. Preferably, this background process is executed repeatedly to transfer variable rewritten during the execution of the software.

Also, according to yet another preferred embodiment of the inventive method the repeated execution of the at least one background process comprises the sub-steps marking a variable to be transferred each time it is rewritten by the old software, repeating the background process only for marked variables, and removing marks of transferred variables.

Thus, according to the inventive method potentially inconsistent variables are marked in a way that the marking is started at the same time as the background process starts. In particular, each data item to be transferred and that is written by the old software during the execution of the old software is marked. When the background process has scanned all data to be transferred it is started again but now only on the variables being marked to be transferred. After a transfer the marking of a data item is then cleared. Then again all variables that are written by the old software after the start of the second turn of the background process are marked. This loop continues until the number of rewritten marked variables during a turn of the background process does not decrease compared to the previous turn. Then, the remaining few variables may be transferred during a processing stop. In case such a processing stop is necessary the time therefor is minimized so as to achieve the maximum efficiency possible.

Also, both the inventive software processing device and the inventive method may be used within a plurality of applications, e.g., the upgrading of software within central processing units of mobile communication systems, the upgrade of a data base within minimal disturbance in case of a change of the structure of the data base, or the update of an operating system, respectively.

BRIEF DESCRIPTION OF FIGURES

Preferred embodiments of the present invention will be described with respect to the enclosed drawing in which.

DESCRIPTION OF PREFERRED
EMBODIMENTS OF THE INVENTION.

Figure 1:
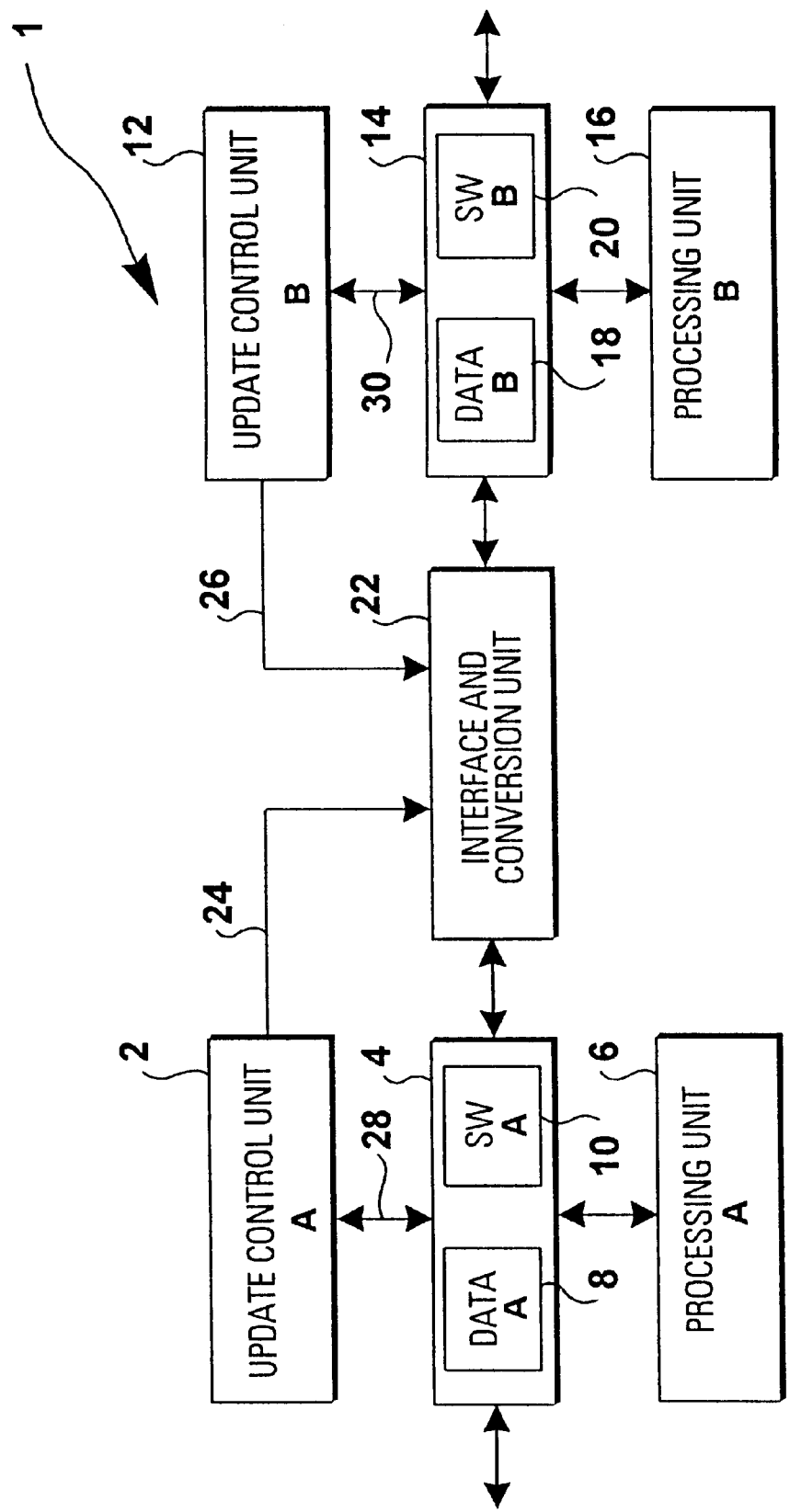
FIG. 1 shows a schematic diagram of the software processing device according to a first embodiment of the present invention.

FIG. 1 shows a schematic diagram of a software processing device 1 according to the first embodiment of the present invention.

As shown in FIG. 1, the software processing device 1 consists of a side A and a side B. In particular, for the side A there is provided an update control unit 2, a memory partition 4 and a processing unit 6. Further, the memory partition is divided into a data storage section 8 and a software storage section 10. Also, for the side B there is provided a second update control unit 12, a second memory partition 14 and a second processing unit 16. As for the A side the memory partition 14 is divided into a data storage section 18 and a software storage section 20.

Further, as shown in FIG. 1 the memory partition 4 at the A side and the memory partition 14 at the B side are linked through an interface and conversion unit 22. This interface and conversion unit 22 is controlled by the update control unit 2 at the A side via a link 24. Further, the update control unit 12 at the B side may control this interface and conversion unit 22 through a further link 26. Also, both update control units 2, 12 are connected to the related memory partitions 4, 14 via additional links 28 and 30.

Figure 2:
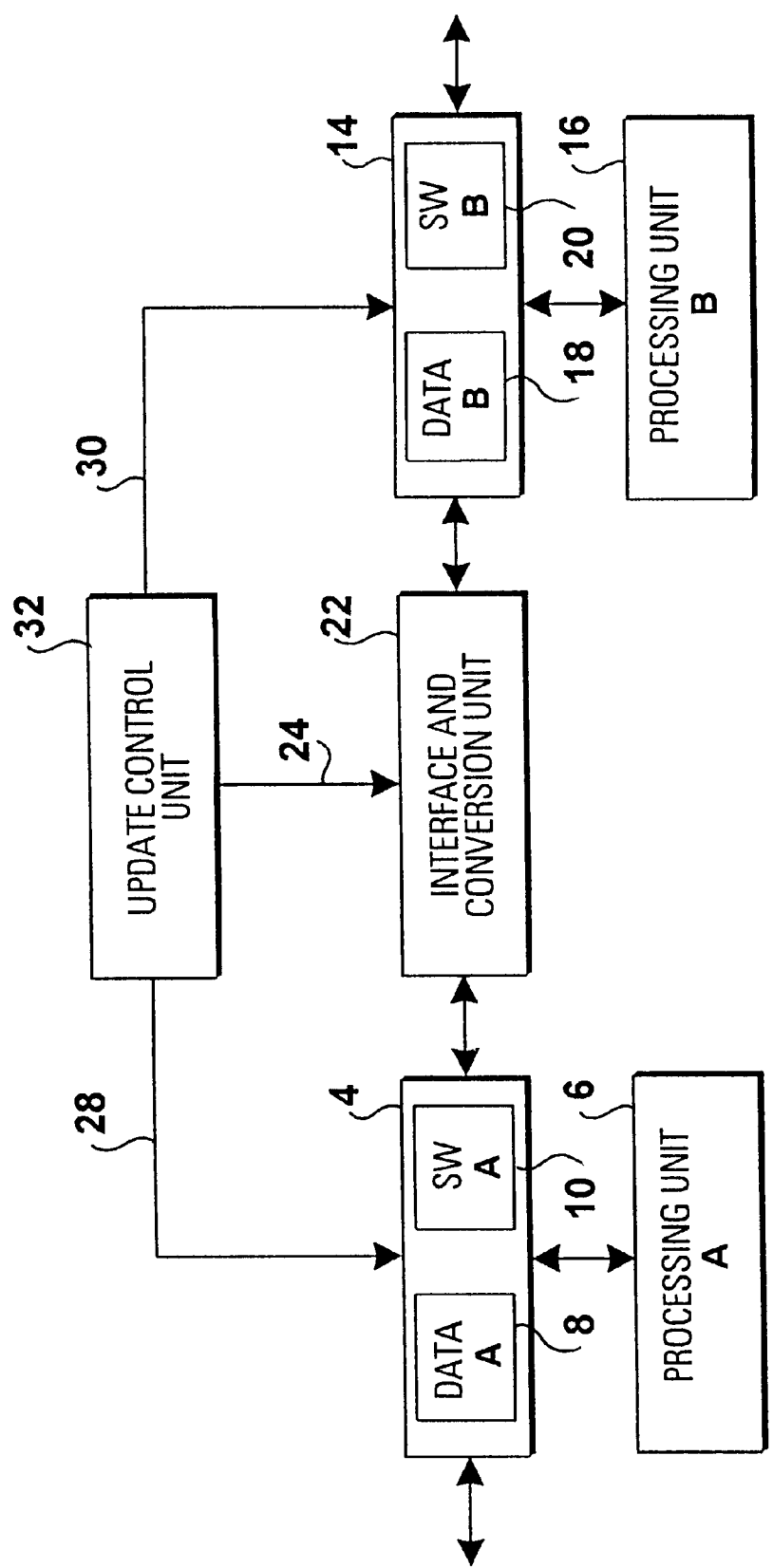
FIG. 2 shows a schematic diagram of the software processing device according to a second embodiment of the present invention.

FIG. 2 shows a schematic diagram according to the second embodiment of the present invention wherein units having the same functionality as those shown in FIG. 1 are denoted with the same reference numerals. To avoid repetitions explanation thereof will be omitted here.

As shown in FIG. 2 according to the second embodiment of the software processing device the functionality of the update control unit 2 and 12 shown in FIG. 1 is integrated into a single update control unit 32. Further, the update control unit 32 must not be assigned to a specific side A or B but may be part either of the side A or B.

Figure 3:
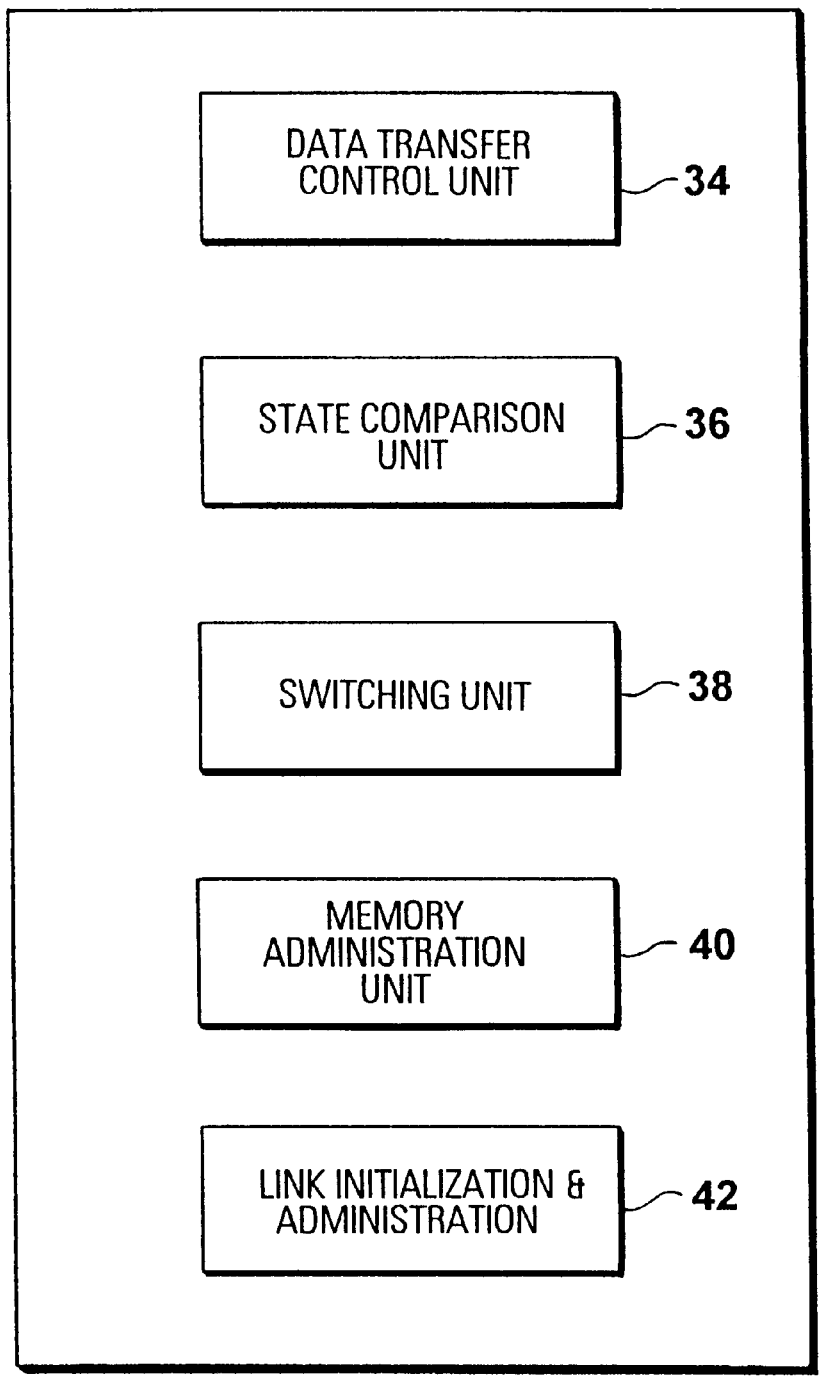
FIG. 3 shows basic components of the update control unit shown in FIGS. 1 and 2.

Basic components for the different update control units 2, 12, and 32 are shown in FIG. 3. In particular, the update control unit comprises a data transfer control unit 34 to handle the transfer of data with respect to old and new software between the A side and B side. Further, there is provided a state comparison unit 36 to compare the state of the old and the new software at the A and B side and to trigger the switching unit 38 in case a coincidence of the states is determined. The memory administration unit 40 executes the memory administration during loading of the new software, in particular allocation of storage sections, deallocation of storage sections, compactation of storage sections, and modification of base addresses for data variables. Finally, the link initialization and administration unit 42 initializes links between reference storage tables related to the different software modules in the new software storage section 20 after loading of the new software therein and also reference information being related to data variables in the date storage section 18 of the memory partition 14 at the B side. Further details of the different components of the update control unit will be described in the following through Reference to FIGS. 4 to 8.

In case this update control unit is of the distributed type as shown in FIG. 1, the first three components may be assigned to the update control unit 2 at the A-side and the remaining components may be assigned to the update control unit 12 at the B-side, respectively.

While in the above, two embodiments of the software processing device according to the present invention have been described with respect to FIGS. 1 and 2, in the following the functionality thereof will be explained with respect to FIGS. 4 to 9. Without restriction to the invention it is assumed that new software is loaded at the B-side.

Figure 4:
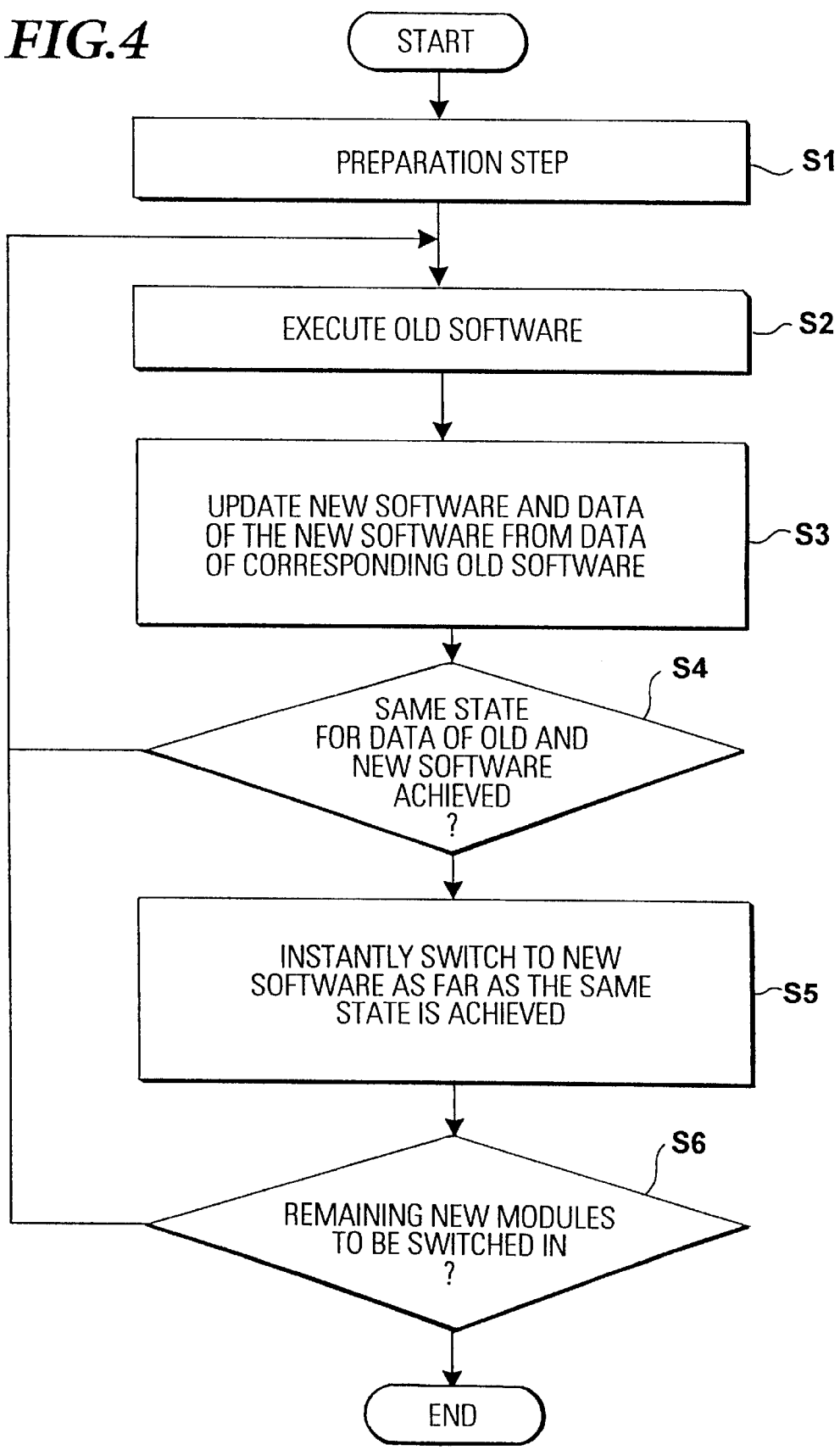
FIG. 4 shows a flowchart for the inventive method to update software.

As shown in FIG. 4, the processing units of both sides start with a preparation step S1 to load new software and to initialize the reference storage therefore. Further, according to step S2 the execution of the old software that typically is arranged into modules is continued during the complete update process. Simultaneously with the execution of the old software in step S2 the update control units 2 and 12 or the update control unit 32 triggers the update of new software and the transfer of data between the old and new software in step S3. It is this concurrent execution of different tasks in step S2 and S3 that allows for a significant improvement of the overall efficiency of the update process.

In addition, as shown in FIG. 4 as soon as the state comparison unit 36 determines consistency of data being related to old and new software in step S4 the switching unit 38 in step S5 immediately switches service to the new software as far as the same state is achieved. The step S4 may operate per group of new and old software modules or for all software modules, e.g., as one group. After each such switching step S5 the data transfer control unit 34 determines in step S6 whether data to be transferred remains in either the first data storage section 8 or the first software storage section 10, respectively. If this is the case, the update process returns to step S2 to further transfer old software and related data until the complete update process is finished.

According to the present invention the switching unit 38 for old and new software shown in FIG. 3 may be operated on a modular basis. Also, data to be transferred is continuously identified while the old software continues to execute its service. Preferably, the identification of data to be transferred and the transfer itself in the steps S3 to S6 is realized with at least one background process simultaneously executed with the old software.

Thus, according to the invention the disturbance during the execution of a function change is heavily reduced so that a function change may be executed during normal working hours instead of during the night. Therefore, the software provider does not loose revenues through the update and the subscribers to the software will not experience any deteriorated service. Overall, the update of software may be added more frequently to the system since the costs for an upgrade are reduced. Also, new features may be offered more easily to subscribers.

In the following, further details for the operation of the software processing device according to the first and second embodiment shown in FIGS. 1 and 2 will be explained with respect to FIGS. 5 to 9.

Figure 5A:
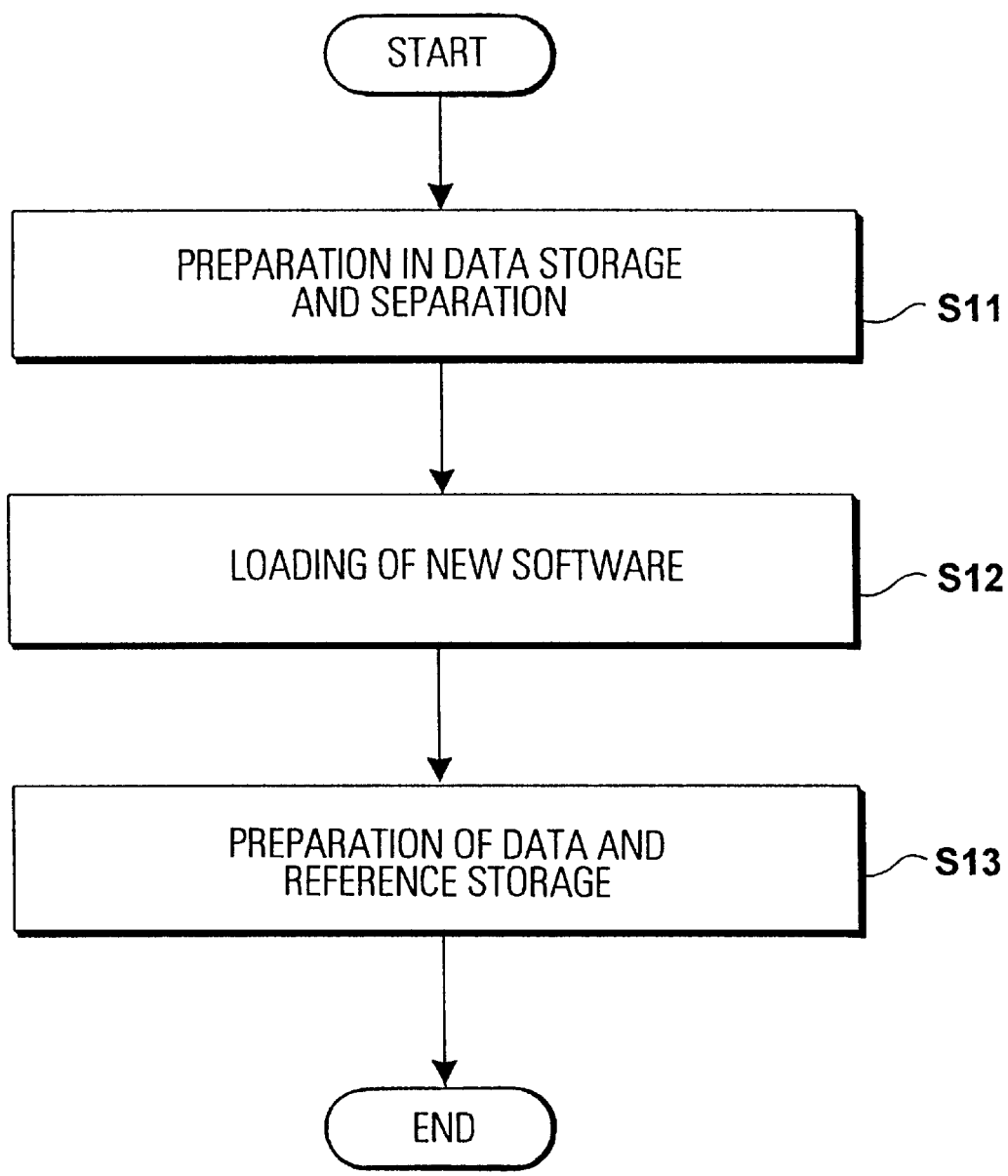
FIG. 5a shows a flowchart giving further details for the preparation step shown in FIG. 4.
Figure 5B:
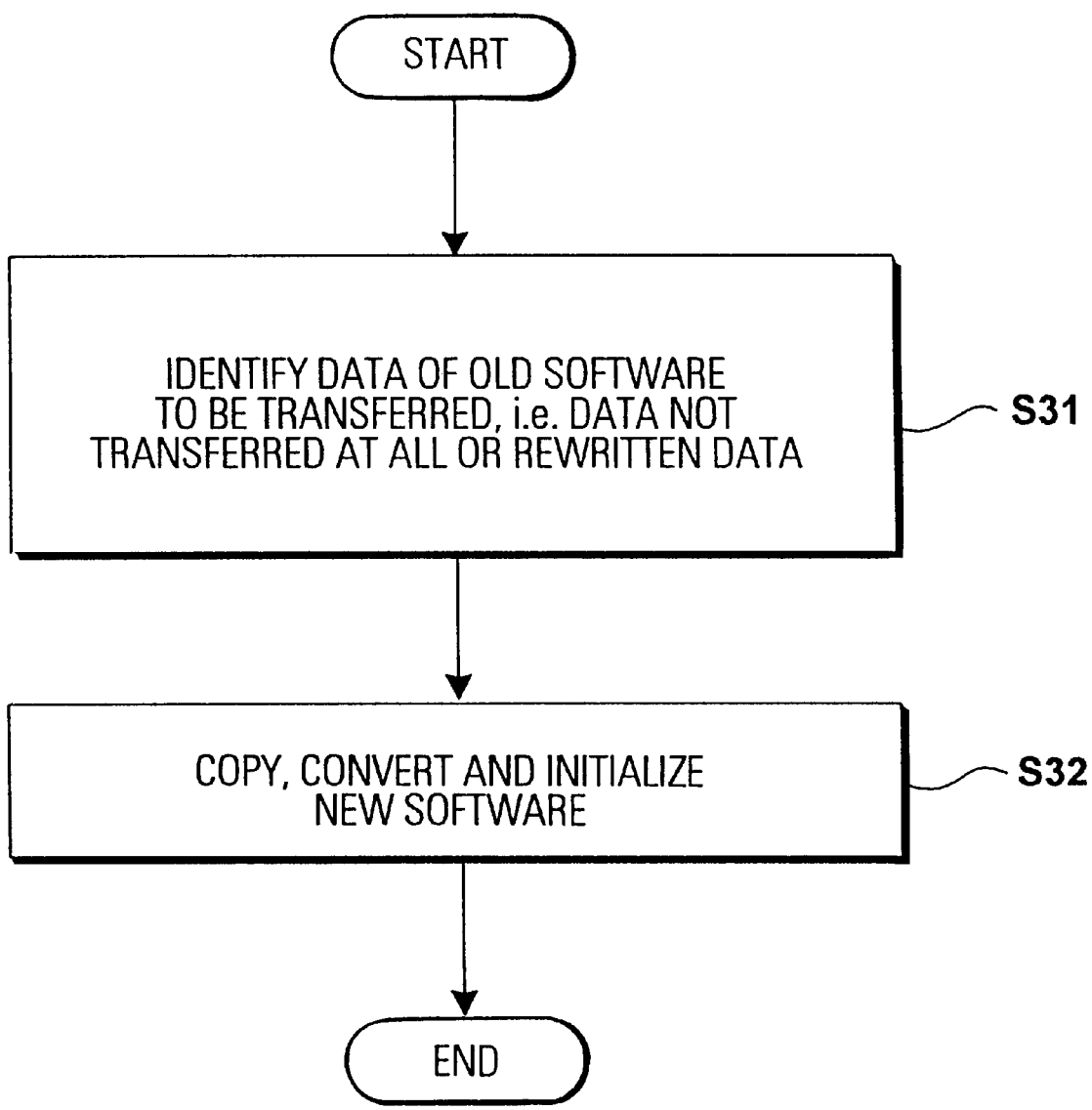
FIG. 5b shows a flowchart giving further details for the step to update new software and related data shown in FIG. 4.
Figure 8:
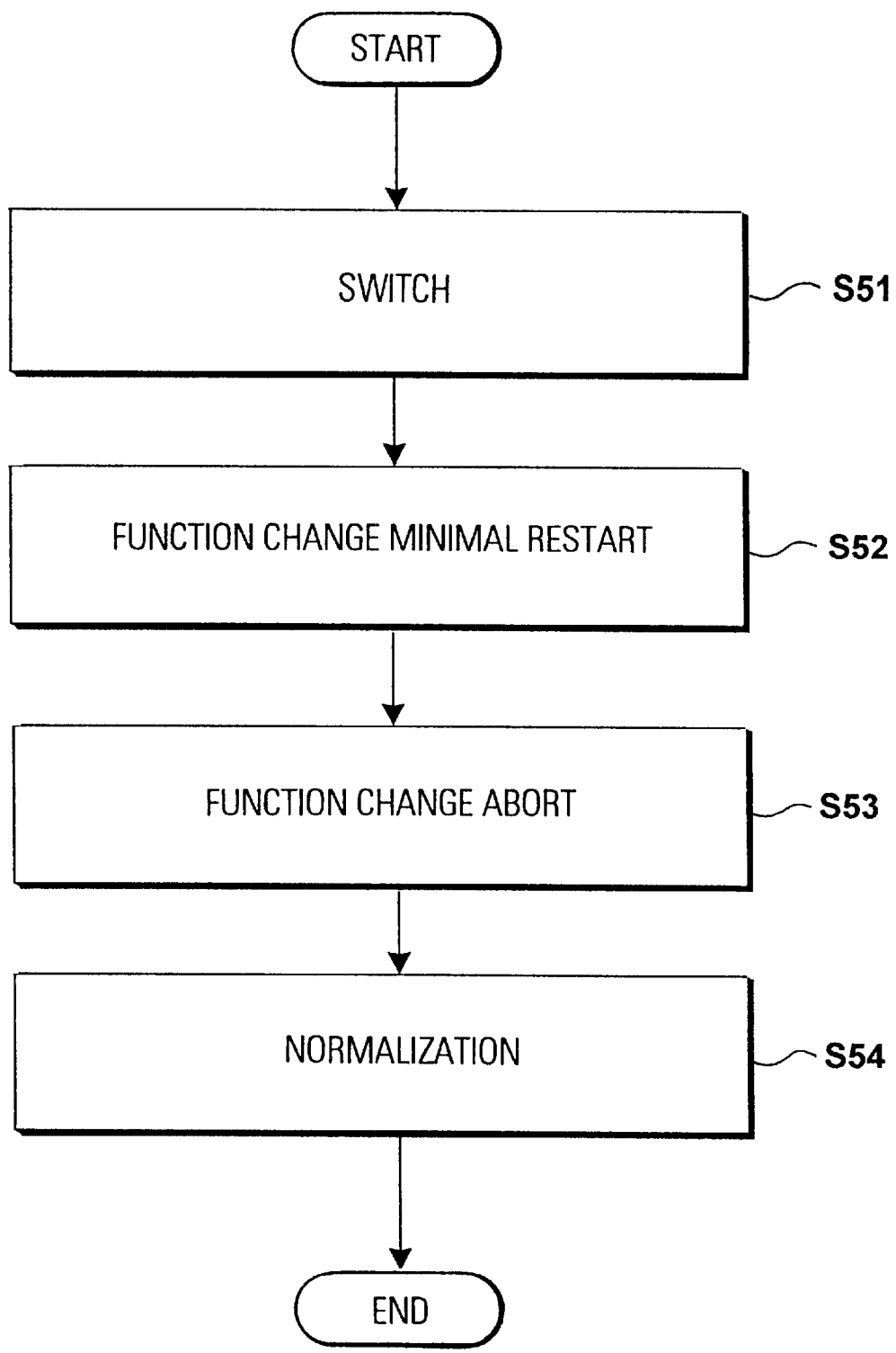
FIG. 8 is a detailed flowchart for the step to instantly switch at least one service to new software modules referred to in FIG. 4.
Figure 9:
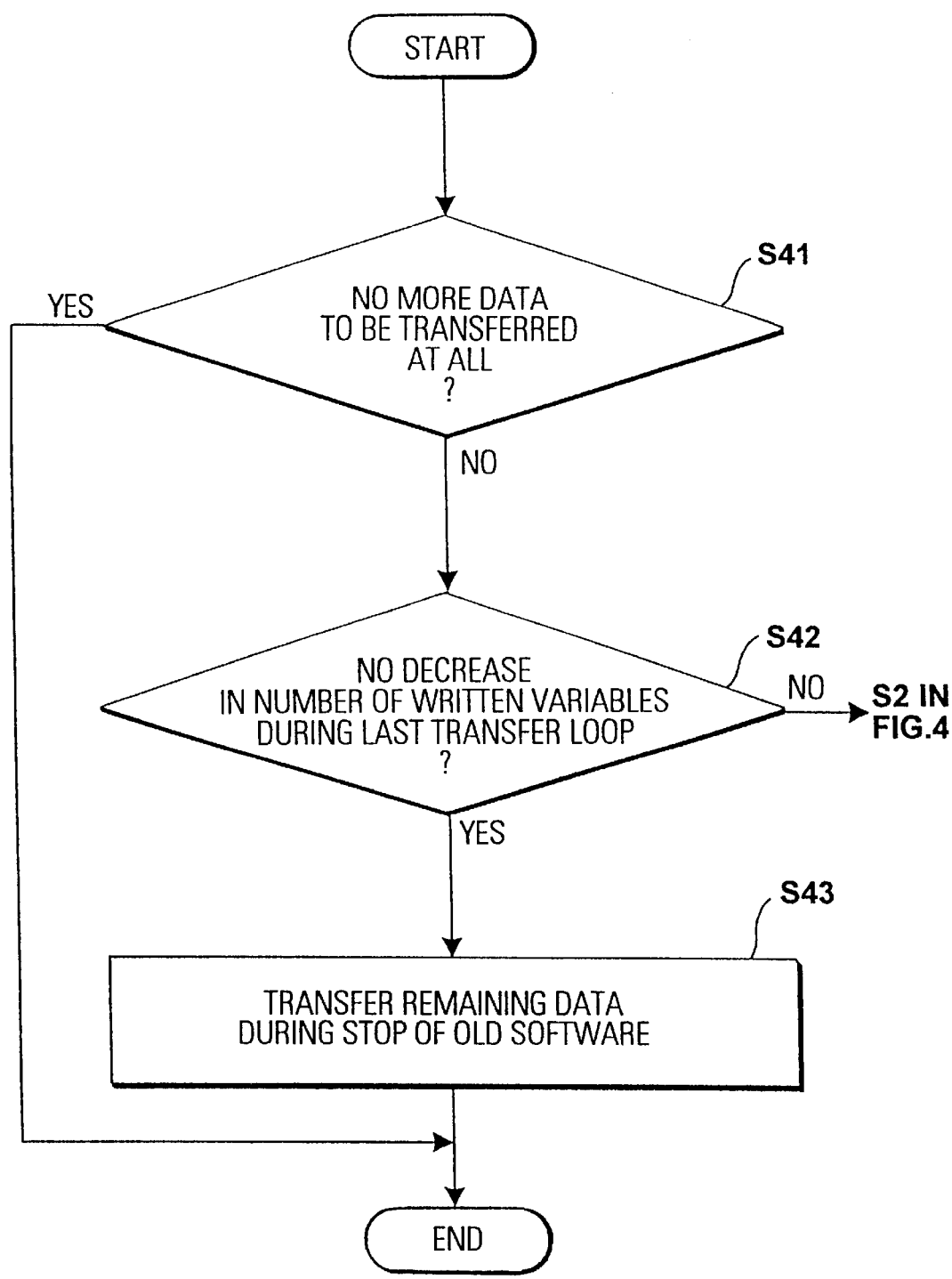
FIG. 9 shows a detailed flowchart according to the step to evaluate remaining data referred to in FIG. 4.

In particular, FIGS. 5a and 5b shows details for the updating of software according to steps S1 and S3 shown in FIG. 4. FIG. 8 shows details of the switching of services to new software according to step S5 in FIG. 4. FIG. 9 shows details for the determination of remaining data to be transferred in order to achieve the same state according to step S4 shown in FIG. 4.

In the following details of the steps S1 as preparation step and step S3 to update new software and data being related thereto will be explained with respect to FIG. 5 a and FIG. 5b, respectively.

As shown in FIG. 5a, the first step S11 to prepare the update of new software relates to the preparation of data storage section at the B-side and is executed by the memory administration unit 40. Here, a relocation of data storage between the different memory partitions is executed to enable the transfer of data variables therebetween at a physical data storage addressing level. In particular, the memory partitions 4, 14 are relocated such that variables are occupying a suitable address space in the memory partition. Therefore, data variables later may coexist with data variables of the new software.

Further, as shown in FIG. 5a in step S11 a separation of the memory into different memory partitions is carried out to achieve enough memory to host old as well as new software and also conversion programs for the conversion of data.

The next step S12 shown in FIG. 5 a relates to the loading of the new software and is executed by the memory administration unit 40. In addition to the new software conversion information necessary for the transfer of data is stored into the memory partition to be updated. The conversion information comprises code for the conversion of source variables into convert variables and information on variables that should be copied or used as source variables. Further, the conversion information is related to base address changes.

Still further, the memory administration unit 40 removes old changed or deleted software from the software storage section 20 at the updated partition 14 except for the software needed for the function change itself. Added and changed new software is loaded into the software storage section 20 of the updated memory partition 14. Hereby storage area is allocated for added and changed software, but size alterable arrays are given only initial size. During the update process the execution of services is still executed by the old software.

As shown in FIG. 5a, in a further step S13 reference storage is prepared and modified by the link initialization and administration unit 42. In particular, reference storage information is kept for the removed software, since this information is needed later on to link the conversion programs to the old versions of data variables. Further, reference storage area is also allocated and filled in for the new software. Thus, after step S13 there exist base address tables BAT for the new software as well as the old software.

Figure 6:
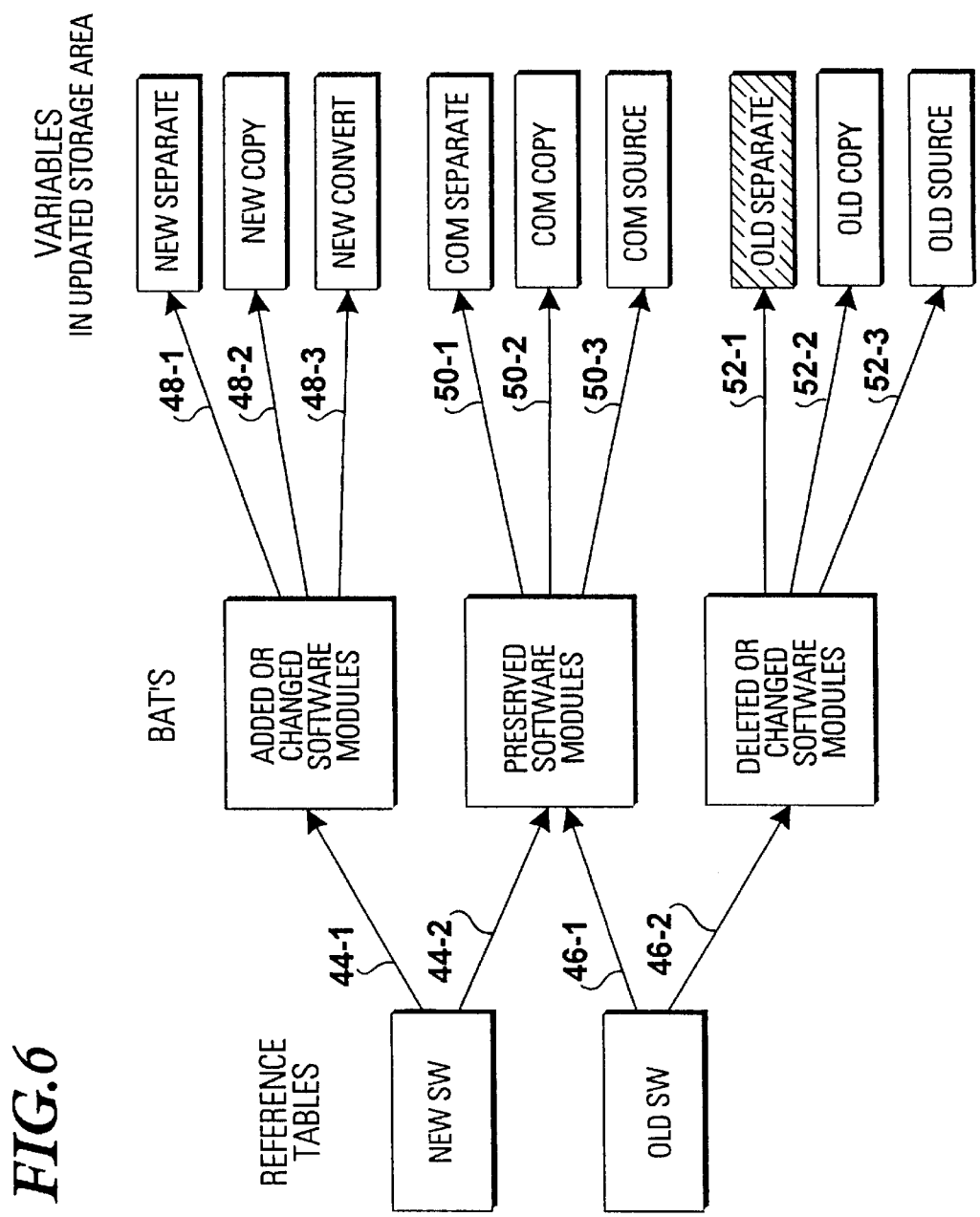
FIG. 6 shows the state of a reference storage after loading of new software modules.

The outcome of the preparation step S12 referred to above is shown in FIG. 6 showing base address tables BAT and data storage sections in the memory partitions 4, 14 after the loading of new software at the B-side. Reference tables are maintained with respect to the new and old software to give an overview on the software being actually available. Further, base address tables BAT provide addresses for different software modules which are distinguished into the type added or changed software module, preserved software module and deleted or changed software module, respectively.

In particular, FIG. 6 shows that new software is related either to added or changed software modules 44-1 or to preserved software modules 44-2. Further, old software is either related to preserved software modules 46-1 or to deleted or changed software modules 46-2.

As shown in FIG. 6, also a link between the different software modules and the related variables stored in the data storage area of the respective memory partitions is achieved through pointers 48, 50, 52, respectively. After the loading of the new software added or changed software modules are linked to new separate, copy and convert variables, 48-1 to 48-3. Further, preserved software modules are linked to common separate, copy and source variables, 50-1 to 50-3. Finally, deleted or changed software modules are linked to old separate, copy and source variables, 52-1 to 52-3.

Figure 7:
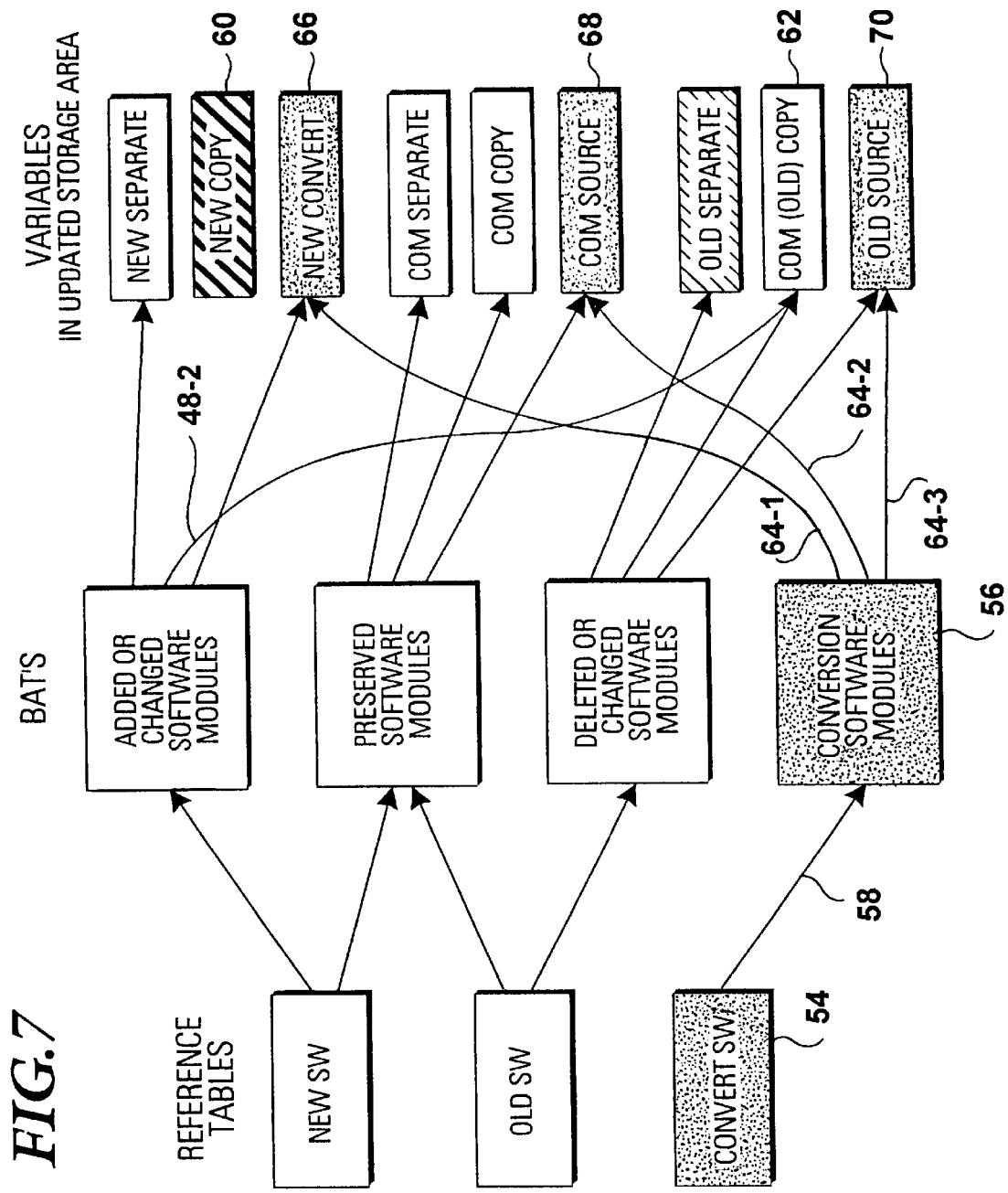
FIG. 7 shows the state of the reference storage after the preparation step of new software modules in FIG. 4.

The impact of step S13 to establish an updated reference storage is shown in FIG. 7. For the purpose of the update process, conversion software 54 is added to the reference tables and related new conversion software modules 56 are added to the base address tables BAT. It should be noted that the conversion software is related to the conversion software modules through a link 58.

As shown in FIG. 7, after the update of the reference storage according to step S13 the link 48-2 to the new copied variables 60 is redirected to the old common copied variables 62. Therefore, it is no longer necessary to preserve storage area for new copied variables in the updated data storage section 14.

Further, the base address table BAT 56 for the newly inserted conversion software modules has links 64-1 to 64-3 to the variables of the type new convert 66, common source 68 and old source 70, respectively. This means that the conversion software modules have an impact on the actual contents that is finally stored in these variables 66, 68, 70.

Thus, the link initialization and update unit 42 rebuilds the base address tables at the B-side of the updated memory partition 14, and temporary base address tables BAT 56 are introduced on this side for conversion purposes. These base address tables BAT 56 are used by the conversion software modules, and the entries in the new base address tables are changed to point to the old instead of the new copy data variables so that afterwards the corresponding old data variables are common for the respective old and new software. The new copy data variables may thus be removed from the data storage section 18 at the B-side.

Further, data variables that are only going to get new base addresses and to retain their value, structure, size and number of individuals are treated as copy data variables. The same holds true for data variables that are only going to inherit their size from the old software.

Still further, variables of the convert type that according to the conversion information inherit their size from the old software modules are allocated in the updated data storage section 18. In order to re-use the previously deallocated memory from the new copy data variables, the data storage section 18 may first be packed. Data variables shown unshaded in FIG. 7 are maintained unchanged. Further, data variables shaded in FIG. 7 are modified through the conversion modules.

This result of the preparation of the reference storage in step S13 serves as basis to copy, convert data to the updated memory partition in step S32 executed in the interface and conversion unit 22. In particular, data variables of the type copy and source are transferred from the side A to the side B during the further execution of the old software. The copies are made every time data is written by the old software and it takes place at a physical addressing level.

The overall modification of the data variables through interface and conversion unit 22 in dependence on the modification of related software may be summarized as follows:

| Data variable type | Source | Copy | Convert | Separate |
|---|---|---|---|---|
| New Software: added or changed software modules | — | Changed reference to point to data of old software | Maintained reference | Maintained reference |
| Preserved software modules | Maintained reference | Maintained reference | — | Maintained reference |
| Old software: deleted or changed software modules | References to be removed when no longer needed | References to be removed when no longer needed | — | References to be removed when no longer needed |
| Conversion software modules | Temporary reference to common and old source | — | Temporary reference to new convert | — |

FIG. 5b illustrates further details of the update of new software according to step 3 shown in FIG. 4. Here, the first step S31 is executed in the interface and conversion unit 22 and controlled by the data transfer control unit 34 and achieves the identification of data of the old software that must be transferred. In particular, step S31 serves to identify data not being transferred so far and data that already has been transferred but again has been rewritten by the old software due to the continuation of the execution thereof. According to one option of the present invention the respective data variables may be marked.

For step S31 data change information may be used in the data transfer control unit 34 to specify data to be transferred solely through copies into new data variables.

Another option is data changing its base address and otherwise retaining its value, structure, size and number of individuals of the related data variable. Further, data change information may also specify that certain kind of data must be converted by applying a conversion functionality.

Another category for the update of data is separate data being related to variables in the new software which should not be copied or obtained in any way from the old software.

Finally, data may be of the source type, i.e. be used to obtain the value of some converted variables. In particular, data may be both of the source and copy type, respectively.

As shown in FIG. 5b, the second step S32 to update software relates to the copying, conversion and initialization of new software and data being related thereto. This second step S32 is controlled by the data transfer control unit 34 and achieves a modification of the data and reference storage as explained in the following.

Here, the following information is transferred between the originating and the source memory partitions 4 and 14:

Data: One word of data,

Address: The complete address of the written data including the bit address for individuals being shorter than a word, Wild card: A bit indicating that more than one individual has been written in a single write operation, Category: A bit indicating that the variable is of the type source.

In order to ensure that all concerned data variables will be transferred, data variables of the type copy and source are read and written within the at least one background process outlined above with respect to FIG. 4.

Further, as soon as the background process is completed conversion starts for convert data variables at the B-side. It is executed in parallel with the copying between the memory partition at the A-side and the memory partition at the B-side. According to the invention, the conversion is made on an individual level each time data occurring in a conversion statement is written through the old software As shown in FIG. 5b, the step S32 comprises the initialization of new software to be executed when the background conversion of data variables is finished. The purpose is to initialize the new software modules before the actual execution thereof. In particular, the initialization takes place parallel with the copying and conversion of data. Different types of logical links and references which normally are established during the execution of the system start or restart and that need updating after the change of software are reestablished.

Referring to FIG. 4 in step S4 the state comparison unit 36 is activated to determine the state of data with respect to old and new software. The sub-steps being related to this step S4 are shown in FIG. 9 and comprise two interrogations, i.e. whether data to be transferred remains at all in step S41 and whether the number of rewritten or marked data variables during the last backup processing loop has decreased in step S42.

In case the number of rewritten or marked data variables has decreased during the last backup processing loop, the update process branches again to step S2 shown in FIG. 4. Otherwise, the transfer of the remaining data variables is executed during the stop of the old software to finish the overall update procedure. In case the same state is achieved, the process proceeds to step S5 being executed in the switching unit 38 to instantly switch service to the new software as far as the same state is achieved. FIG. 8 shows the sub-steps being related to the switching of services to new software modules that will be explained in the following:

The first step S51 shown in FIG. 8 relates to the switching between the memory partition at the side A and the memory partition 14 at the side B. Here, the execution of software modules to be switched is stopped at the A-side, together with the scanning of related process tables. Current processes in process buffers are either executed or eventually removed. In case software modules must be removed related transactions, when applicable, should be finished.

In step S52 follows the minimal function change restart at the B-side. The main function of this—optional—step S52 is to take over the external communication to further software processing devices being linked to the updated software processing device. Also, processing tables and timing signals being related to this external communication may be initiated. To save time, the restart signal may be send only to the software modules concerned. Which software modules are concerned can be decided from the previous initialization (step S32) either by function codes or through explicit signals from the concerned software modules.

The next step S53 shown in FIG. 7 is optional and relates to function change abort such as, e.g., the canceling of transactions. In particular, the present invention provides the transaction concept that relates to the notion of a state of the transaction. This state applies to the transaction as a whole. According to the present invention two states are differed, i.e. a first stable state where the state of the transaction is well defined in the sense that a mapping from the old software module to the new software module is possible and the metastable state where the opposite holds true. The advantage of this transaction concept is that it is possible to avoid expensive mechanism for the conversion of all possible metastable states.

After step S53 the memory used for conversion purposes and shown shaded in FIG. 7 is deallocated and then the reference storage is cleaned up.

The last step S54 shown in FIG. 8, relates to a normal parallel start for the initial and final executing side. This step is performed when the new software has been executing for a while so that errors in the new software are highly unlikely. Before this normalization step S54 the updated side serves as a backup keeping the old software in memory.

Referring again to FIG. 4, after the switch over in step S5, the final step S6 in the main flowchart relates to the evaluation whether remaining data is still to be transferred or if all new module have been switched in and are executed.

From the above description of the inventive approach it follows that it is applicable to both a single software processing device or a plural software processing device with distributed processing.

The obvious advantage of the use in a single software processing device is that there is no need to copy data between different software processing devices. Also, the conversion programs may be started as simple software interrupts from the normal instruction execution. To overcome the drawback that the instruction pipeline would be broken with every writing of a source data variable and the related bad impact on the normal execution times, one possibility would be to buffer the source data variable address at the software interrupt.

The use of multiple software processing devices is advantageous in that it requires less memory and processing capacity in each processing device. The reason for this is that the program storage section must not host the old software, the new software as well as conversion programs. Further, the data storage section must not host data variables of the type separate for the old as well as the new software. For the program storage section this means a much lower demand when compared to the implementation according to a single software processing device. For the data storage section the demand is also lower. Finally, the processing capacity demand is decreased significantly, since the conversion programs as well as the original programs will be executed at different sites using a plurality of software processing devices.

Overall, the leading principles according to the invention making a disturbance-free function change of software possible, may be summarized as follows. The copying and conversion of data from the old to the new software is performed in parallel with and without disturbance of the normal software execution. The modules in the new software are initialized performing a function change start performed in parallel with an without disturbance of normal software execution. A switch to the new software is performed with a minimal function change restart during stop of software execution, followed by an abort of unstable transactions in parallel with software execution.

Further, underlying principles to the present invention are the copying of the value of a data variable into a new data variable or the same data variable with a changed base address, retaining the value, structure, size and number of individuals of the variable by allocating the original physical location of the data variable in the data storage to the new base address table entry. Here, according to the invention, the allocation is done before the actual copy and conversion takes place. This means that there is no need to execute real conversion programs for such assignments. To the contrary, a single copy will result in the intended conversion.

Further, new parts in the new software are allocated memory in the data storage section before the copy and conversion is started. This means that there is no need to spend resources for compactation of memory during the critical conversion time.

Further, transfer of values for copy and source data variables between the different sides is done at each write of data variables. To guarantee all data variables to be transferred, all data variables are scanned on a background level.

Further, conversion programs at the updated side are started at each transfer of the source data variable value. For every start the conversion program is normally executed only for the single individual of the data variable concerned, and not as an iteration over all individuals of the data variable. To guarantee that all data variables are assigned data values, all conversion programs are run once for each individual on a background level.

Further, the minimal function change restart is very fast containing no initialization, e.g., static linking. This means that it does not disturb the normal software normal execution even if there is a short stop during the execution.

Finally, transactions that are not in a well defined state at switching are aborted. The notion of a state of a transaction, i.e. stable or metastable, defines whether or not the state is well defined. Here, there is guaranteed a consistent state for the new software for all transactions that are in a stable state. The remaining transactions will be aborted.

While in the above different embodiments of the present invention have been described, they should not construe a limitation to the present invention and further modifications and variations might be considered as explained in the following:

One such example would be a transfer of data variable address to the data storage section between the different sides at a high level address. Here, the data variable address would consist of the base address of the data variable, and further of the pointer or index, if applicable. The main advantage of this modification is that it simplifies the conversion.

Another modification would be an update of software modules involving other parts than software modules stored in a specific software processing device. In particular, one could consider the update not only of software but also of hardware. Also, one could consider switching over the execution of software to another software processing device during the hardware update.

Still further, one could consider a combined update of software and hardware at different software processing devices by first changing the hardware parts and then changing the software parts using the method according to the present invention. Here, not all the components have to be changed at the same time and consequently there is no need for a global restart in the distributed system.

TABLE 1

List of Reference numerals

| | |
|---|---|
| 1 | Software Processing Device for Software Update Unit |
| 4 | First Memory Partition |
| 14 | Second Memory Partition |
| 2, 12, 32 | Update Control Unit |
| 22 | Interface and Conversion Unit |
| 8 | First Data Storage Section |

TABLE 1-continued

List of Reference numerals

| | |
|---|---|
| 10 | First Software Storage Section |
| 18 | Second Data Storage Section |
| 20 | Second Software Storage Section |
| 24 | First Link |
| 26 | Second Link |
| 28 | Third Link |
| 30 | Fourth Link |
| 44 to 52, 58, 64 | Links in Stored Reference Data |
| 56 | Base Address Table for Conversion Software Module |
| 60, 62, 66 to 70 | Variables in Updated Data Storage Area |

What is claimed is:

1. Software processing device of the type with update functionality, comprising:
   a) memory means (4, 14) subdivided into
      a1) a first memory partition (4) storing a first group of software and related data, and
      a2) a second memory partition (14) storing a second group of software and related data,
   b) software update means (2, 12, 22; 22, 32) adapted to
      b1) load software and related data into the first memory partition (4) while
      b2) simultaneously continuing software processing with software stored in the second memory partition (14), and to
      b3) instantly switch over execution of software as far as the same state for the loaded and executing software is achieved.

2. Software processing device according to claim 1, wherein the first memory partition (4) is divided into a first data storage section (8) and a first software storage section (10).

3. Software processing device according to claim 1, wherein the second memory partition (14) is divided into a second data storage section (18) and a second software storage section (20).

4. Software processing device of the type with update functionality, comprising:
   a) memory means (4, 14) subdivided into
      a1) a first memory partition (4) storing a first group of software and related data, and
      a2) a second memory partition (14) storing a second group of software and related data,
   b) software update means (2, 12, 22; 22, 32) adapted to
      b1) load software and related data into the first memory partition (4) while
      b2) simultaneously continuing software processing with software stored in the second memory partition (14), and to
      b3) instantly switch over execution of software as far as the same state for the loaded and executing software is achieved, wherein
   c) a processing means (6,16) is adapted to execute software stored in the first memory partition (4) and second memory partition (14).

5. Software processing device according to claim 4, wherein the first memory partition (4) is divided into a first data storage section (8) and a first software storage section (10).

6. Software processing device according to claim 4, wherein the second memory partition (14) is divided into a second data storage section (18) and a second software storage section (20).

7. Software processing device of the type with update functionality, comprising:
a) memory means (4, 14) subdivided into
a1) a first memory partition (4) storing a first group of software and related data, and
a2) a second memory partition (14) storing a second group of software and related data,
b) software update means (2, 12, 22; 22, 32) adapted to
b1) load software and related data into the first memory partition (4) while
b2) simultaneously continuing software processing with software stored in the second memory partition (14), and to
b3) instantly switch over execution of software as far as the same state for the loaded and executing software is achieved, wherein
c) a processing means (6,16) is adapted to execute software stored in the first memory partition (4) and second memory partition (14), respectively.

8. Software processing means of the type with update functionality, comprising:
a) memory means (4,14) subdivided into
a1) a first memory partition (4) storing a first group of software and related data, and
a2) a second memory partition (14) storing a second group of software and related data,
b) software update means (2,12,22; 22,32) adapted to
b1) load software and related data into the first memory partition (4) while
b2) simultaneously continuing software processing with software stored in the second memory partition (14), and to
b3) instantly switch over execution of software as far as the same state for the loaded and executing software is achieved, wherein
c) software update means (2,12,22; 22,32) comprises a state comparison means (36) to evaluate whether software in the newly loaded memory partition (4,14) and the memory partition (14,4) maintained unchanged have reached a state to switch over execution of software.

9. Software processing device according to claim 8, wherein the update control means (2,12; 32) further comprises a switching means (38) to instantly switch over execution of software as far as the same state for the old software and the new software is achieved.

10. Software processing device according to claim 8, wherein the update control means (2,12; 32) further comprises a memory administration means (40) to allocate, deallocate, pack, or modify base addresses in the memory partition (4,14) to be updated.

11. Software processing device according to claim 8, wherein the update control means (2,12; 32) further comprises a link initialization and administration means (42) adapted to establish a correct reference between the newly loaded software and the updated data in the updated memory partition (4,14), respectively.

12. Software processing device of the type with update functionality, comprising:
a) memory means (4,14) subdivided into
a1) a first memory partition (4) storing a first group of software and related data, and
a2) a second memory partition (14) storing a second group of software and related data,
b) software update means (2,12,22; 22,32) adapted to
b1) load software and related data into the first memory partition (4) while
b2) simultaneously continuing software processing with software stored in the second memory partition (14), and to
b3) instantly switch over execution of software as far as the same state for the loaded and executing software is achieved, wherein
c) the software update means (2,12,22; 22,32) further comprises interface and conversion means (22) to load software and related data into one of the first or the second memory partition (4,14), respectively, through transfer of software and related data from one of the second or first memory partition (14,4), respectively.

13. Software processing device, according to claim 12, wherein the interface and conversion means (22) is adapted to carry out the transfer of software and related data in a background process executed simultaneously with the execution of software in the processing means (6, 16).

14. Software processing device according to claim 12, wherein the interface and conversion means (22) is adapted to convert software and related data according to instructions received from the update control means (2, 12, 22).

15. Software processing device according to claim 14, wherein the update control means (2, 12; 32) instructs the interface and conversion means (22) to repeat a transfer of software and related data if they have again been modified after a previous transfer.

16. Method for updating software, comprising the steps:
a) loading new software and transferring all data related to the old software and the new software while the execution of the old software is continued (S1, S2, S3),
b) evaluating (S4) whether the data related to the new software has reached the same state as the data related to the old software, and
c) instantly switching the service to the new software (S5) as far as the state of data for the new software and the old software is equal (S4).

17. Method according to claim 16, wherein the old software and the new software is of the modular type and that switching is executed according to software modules (S5).

18. Method according to claim 17, wherein data to be transferred is identified through at least one background process (S3–S6) while the old software continues to execute its service (S2).

19. Method according to claim 18, wherein the background process classifies (S31) all variables of data to be transferred into the type copy, convert, and source, respectively.

20. Method according to claim 19, wherein the background process (S3–S6) transfers the variable to the new software unchanged if the variable is of the type copy.

21. Method according to claim 19, wherein the background process (S3–S6) starts a conversion program to transfer the variable to the new software according to a converted format if the variable is of the type convert.

22. Method for updating software, comprising the steps:
a) loading new software and transferring all data related to the old software and the new software while the execution of the old software is continued (S1, S2, S3),
b) evaluating (S4) whether the data related to the new software has reached the same state as the data related to the old software, and
c) instantly switching the service to the new software (S5) as far as the state of data for the new software and the old software is equal (S4), wherein
d) in case the updated data is again modified by the old software, each of such change is again updated for the new software (S31, S32).

23. Method according to claim 22, wherein with each write to a data variable of the old software having the type copy the data variable is again copied to the new software (S31, S32).

24. Method according to claim 22, wherein with each write to a data variable of the old software having the type convert a conversion program is again started to transfer the conversion result to the new software (S31, S32).

25. Method according to claim 22, wherein the at least one background process (S3–S6) is executed repeatedly (S41, S42) to transfer variables rewritten during the execution of the old software.

26. Method according to claim 25, wherein the repeated execution of the at least one background process (S3–S6) comprises the following sub-steps:
   a) marking a variable to be transferred each time it is rewritten by the old software,
   b) repeating the background process (S3–S6) only for marked variables, and
   c) removing marks of transferred variables.

27. Method according to claim 26, wherein the repetition of the at least one background process (S3–S6) is continued until the number of rewritten variables during one turn of the background process (S3–S6) does not decrease compared to the previous one (S42).

28. Method according to claim 27, wherein the transfer of rewritten variables remaining after the last turn of the at least one background process (S3–S6) is executed during a stop of the old software (S43).

29. Method according to claim 16, which is used for an on site update process of software.

30. Method according to claim 16, which is used for a remote update process of software.

31. Method according to claim 16, wherein old software is assigned to a first memory partition and the new software is assigned to a second memory partition.

32. Method according to claim 16, wherein after the update process the first memory partition and the second memory partition are used to improve redundancy during normal operation.

33. The software processing device of claim 1, wherein the software stored in the first memory partition and the software stored in the second memory partition are in the same state when the related data loaded into the first memory partition includes all data necessary for the software stored in the first memory partition to take over execution of a functionality of the software stored in the second memory partition.

34. The software processing device of claim 1, wherein the software stored in the first memory partition and the software stored in the second memory partition are in the same state when the related data stored in the second memory partition and the related data loaded into the first memory partition are consistent.

* * * * *